United States Patent
Kim (10) Patent No.: US 9,892,625 B2
(45) Date of Patent: Feb. 13, 2018

(54) PERSONAL PROTECTION SERVICE SYSTEM AND METHOD

(71) Applicant: Myung Hwan Kim, Soowon (KR)

(72) Inventor: Myung Hwan Kim, Soowon (KR)

(*) Notice: Subject to any disclaimer, the term of this patent is extended or adjusted under 35 U.S.C. 154(b) by 0 days.

(21) Appl. No.: 15/301,945

(22) PCT Filed: Aug. 26, 2014

(86) PCT No.: PCT/KR2014/007917
§ 371 (c)(1),
(2) Date: Oct. 4, 2016

(87) PCT Pub. No.: WO2015/152475
PCT Pub. Date: Oct. 8, 2015

(65) Prior Publication Data
US 2017/0186307 A1    Jun. 29, 2017

(30) Foreign Application Priority Data

Apr. 4, 2014 (KR) .................. 10-2014-0040408

(51) Int. Cl.
*G08B 1/08* (2006.01)
*G08B 25/01* (2006.01)
(Continued)

(52) U.S. Cl.
CPC ......... *G08B 25/016* (2013.01); *G08B 25/008* (2013.01); *G08B 25/12* (2013.01);
(Continued)

(58) Field of Classification Search
CPC .... G08B 25/08; G08B 25/016; H04W 76/007
(Continued)

(56) References Cited

U.S. PATENT DOCUMENTS

| 8,705,702 | B1 * | 4/2014 | Sieg | H04M 11/04 379/45 |
| 2007/0218923 | A1 * | 9/2007 | Park | H04M 1/72541 455/456.2 |

(Continued)

FOREIGN PATENT DOCUMENTS

| JP | 2013-518501 A | 5/2013 |
| KR | 10-2007-0077695 A | 7/2007 |

(Continued)

OTHER PUBLICATIONS

International Search Report for International Patent Application No. PCT/KR2014/007917 filed Aug. 26, 2014.

*Primary Examiner* — Phung Nguyen (57) ABSTRACT

The present invention relates to a personal protection service and method, comprise: a user terminal requesting a personal protection service by transmitting basic user information, a situation setting message, and etc., when an emergency arises; a personal protection service server connecting to the user terminal through a mobile communication network to provide an Individual Safety Guard service; and a terminal of an institution connected to the personal protection service server and a social safety network. When an emergency arises, a user who encounters danger presses an emergency button on a terminal to immediately request to the personal protection service server that the emergency be transmitted to the terminal of a guardian or an institute linked to the social safety network to respond within a short period of time, and the location of the user terminal requesting rescue is tracked so that safety personnel can be immediately dispatched to provide safety.

18 Claims, 4 Drawing Sheets

(51) Int. Cl.
    *G08B 25/00*     (2006.01)
    *G08B 25/12*     (2006.01)
    *H04L 29/08*     (2006.01)
    *H04N 7/18*     (2006.01)
    *H04W 4/22*     (2009.01)

(52) U.S. Cl.
    CPC .............. *H04L 67/12* (2013.01); *H04N 7/18* (2013.01); *H04N 7/188* (2013.01); *H04W 4/22* (2013.01)

(58) Field of Classification Search
    USPC ................ 340/539.13, 539.11, 573.1, 13.24; 455/404.2
    See application file for complete search history.

(56) References Cited

U.S. PATENT DOCUMENTS

| | | | | |
|---|---|---|---|---|
| 2008/0214142 | A1* | 9/2008 | Morin | G08B 25/016 455/404.2 |
| 2010/0134277 | A1* | 6/2010 | Jang | G08B 7/064 340/539.13 |
| 2011/0319051 | A1* | 12/2011 | Reitnour | G01S 19/17 455/404.2 |
| 2012/0003956 | A1* | 1/2012 | Austin | H04M 1/72538 455/404.2 |
| 2014/0120863 | A1* | 5/2014 | Ferguson | H04M 1/72541 455/404.2 |
| 2015/0213708 | A1* | 7/2015 | Barzangi | H04W 4/028 455/404.2 |

FOREIGN PATENT DOCUMENTS

| | | |
|---|---|---|
| KR | 10-2011-0083027 A | 7/2011 |
| KR | 10-2014-0002863 A | 1/2014 |
| KR | 10-2014-0022705 A | 2/2014 |
| KR | 10-1372575 B1 | 3/2014 |
| KR | 10-1492873 B1 | 2/2015 |
| WO | WO 2011/090360 A2 | 7/2011 |
| WO | WO 2012/024641 A2 | 2/2012 |

* cited by examiner

WEB ESSENTIAL INFORMATION

PUBLIC NETWORK REGISTRATION COMPLETED OK
GUARDIAN REGISTRATION INFORMATION OK
DEPARTING POINT (1$^{ST}$ EXIT OF ORI STATION)
ARRIVAL POINT (BYEOKSAN TOWN 4DANJI 402-611)
ESTIMATED ARRIVAL TIME (30 MINUTES FROM NOW)
1$^{ST}$ ALARM 2 TIMES AFTER 30 MINUTES IN INTERVAL OF 30 SECONDS
2$^{ND}$ ALARM 2 TIMES AFTER THE 1$^{ST}$ ALARM IN INTERVAL OF 30 SECONDS
ALARM TYPE VOICE
EXECUTION

ADDITIONAL CONTENTS WHEN LINKING MAP SERVICE

DEPARTING POINT (DESIGNATING POINT OF 1$^{ST}$ EXIT OF ORI STATION)
WAY POINT (HANARO MART ORI BRANCH)
ARRIVAL POINT (BYEOKSAN TOWN 4DANJI 402-611)

GPS INFORMATION IS AUTOMATICALLY INPUT DURING MOVING

PERSONAL PROTECTION SERVICE SYSTEM AND METHOD

CROSS-REFERENCE TO RELATED APPLICATIONS

The present application is a U.S. National Stage of International Patent Application No. PCT/KR2014/007917 filed Aug. 26, 2014, which claims priority to and the benefit of Korean Patent Application No. 10-2014-0040408 filed in the Korean Intellectual Property Office on Apr. 4, 2014, the entire contents of which are incorporated herein by reference.

TECHNICAL FIELD

The present invention relates to personal protection service system and method, in more details, it is related to personal protection service system and method using application of smart mobile device, portable device or wearable device. In case of emergency, user in danger or disaster is connected to guardian or institution linked to social safety network in order to manage quickly in a short time by requesting for individual safety guard service with smart mobile device carried by the user.

BACKGROUND ART

The level of various kinds of crimes on women, children, juvenile and the elderly is becoming more and more severe, and although various methods and device regarding social safety network has been developed for improving the time limit and limited transmission of the report information to the social safety network connected to guardian or rescue team, police station in case of danger or disaster. However, its function and effect is insignificant, only limited number of users actually use the methods and device, and various institutions such as a police station composing social safety network system lack linkage between thereof. Therefore, in cases of actual risky situations of violence, robbery, sexual violence and kidnapping in dangerous areas, or of emergency rescue situations such as car accident, fire, occurrence of disaster, it takes too much time to manage those accidents, and it may lead to secondary and tertiary accidents.

For example, when a woman has to pass a dangerous area where there is no CCTV or streetlight with only few people walking by, she would be intimidated mentally. Still, there is always possibility of crime such as running into pervert or miscreant, so she would have to go home not too late, should only walk in areas where there are many passers, and so personal protection service is needed. Especially, as violence and sexual violence is a serious crime, the personal protection is needed and prevention in advance is needed as well. Moreover, when ran into a criminal, it is almost impossible for an individual to use one's cell phone or smart mobile to contact someone in front of the criminal. Therefore, as a solution of this case, a system to automatically report to the social safety network is desperately in need. Kids too young might end up as missing children since they may get lost when they do not know the way perfectly, pregnant women, in a sign of child birth, might need emergency measures in a short time since they may not be able to move by oneself without a guardian because of pain and agony, and the elderly might as well be in a situation of possibility of falling at any time since they are weak, so the personal protection service is needed. When students who confront sudden school violence ask for help, unable to avoid the perpetrators, they will be able to contact the guardian and police station near by without letting the perpetrators know.

Moreover, implementation of the 5 workday system resulted in increase in recreation activity, and in case of unexpected accident during leisure activity such as stray in mountain climbing, and in case of car accident, the victim will have to request for rescue by oneself even when one is injured and unconscious. In this case, someone else's quick rescue request may determine the response time of the ambulance and it will determine one's life.

In order to overcome these dangerous situation, server providing personal protection service (Self-safety Guard service) linked to the smart mobile devices most people carry, or downsized portable device who are not able to use the former, did not exist in the conventional social safety network service, and there is no way to manage the urgent situation the user is in, linked to the social safety network such as guardian and rescue team, corresponding to the urgent situation in a short time.

DISCLOSURE

Technical Problem

In order to solve the above problem, the purpose of the present invention is to provide personal protection service system using application of the smart mobile device and portable device. According to the present invention, the user may be able to report emergency in cases of dangerous situation occurred in moment to moment, and in case of emergency situation by disaster by using the application of smart mobile device or separate portable device, wearable devices which are always carriable. The user also may be able to report simply input one's route and may request personal protection service (Self-safety Guard service) to reach the end point more safely, or to be able to manage dangerous place or area with various dangerous situations, quickly managing by transmitting the personal's location, time, information additionally informed by the personal via smart mobile device or portable device to personal protection service server as it is transmitted quickly to rescue team, medical institute, fire station or police station linked to the social safety network.

Another purpose of the present invention is to provide personal protection service method using application of the smart mobile device and portable device.

Technical Solution

In order to achieve the purpose of the present invention, a personal protection service system comprises a user terminal requesting personal protection service by transmitting a user's basic information, a situation setting message, a GPS location information of the user terminal, a time information, dangerous situation information and social safety network code in case of an emergency situation; personal protection service server providing the personal protection service accessed by the user terminal via a mobile communication network; and an institution terminal linked to a social safety network by being linked to personal protection service server social safety network.

The user terminal includes at least one of a smart mobile device, a compact portable device, or a wearable device.

The user terminal may be equipped with application for the personal protection service, and the application function may be operate with user's picture registration function, additional guardian setting function, function of transmitting GPS location information and time information to the server in case of the emergency situation, function of recording voice and transmitting the recorded voice to the server in case of the emergency situation, function of transmitting the danger message to the server in case of the emergency situation, function of storing and transmitting video of the site or visual image of the site taken by snap shot to the server in case of the emergency situation, function of storing and transmitting user's frequently-use route information, function of time input by route of the user, function of setting alarm for numbers of occurrence and time interval, function of setting a cycle of user location tracking, function of emergency report to the social safety network, function of confirming normal/abnormal code input, functions of social safety network code input and message transmission, timer function in case of non-response to the alarm occurrence, function of automatic recording in case of alarm, map-linked service function regarding a GPS location information of the present terminal, function of designating by points during the map-linked service, function of storing message of occurrence of preceding, function of battery check and exclusive use of capacity of battery, function of checking remaining battery and forcefully closing other operating application, function of recommending optimization of application use in case of lack of remaining battery, and function of notifying the power-off due to battery burnt out and other situations.

When an emergency button is pushed in case of emergency situation while the application of the user terminal operates, the user terminal provides a function of immediately reporting stored application information of the user, location, time information, and dangerous situation information to the social safety network, and a function of reporting to the guardian terminal when a guardian option is chosen.

The personal protection service server may operate with function of management of actual user information, function occurring event, function of terminating the event, function of receiving the user information, guardian information, and danger message, function of storing user route information, time consumed following the route, forms of notification message, number of alarm occurrence, and time interval setting, function of storing cycle of user location track, function of setting and driving timer set by the user in advance, function of storing and transmitting of the recorded voice, function of receiving user's danger message, function of receiving terminal's GPS location information and time information in case of the emergency situation, function of tracking terminal's GPS location which received the danger message, alarm function, function of storing and transmitting danger message/image/video, function of reporting emergency with the user information to the institute linked to the social safety network regarding the user's situation when the user reports emergency, function of connected transmitting to the institution terminal of the social safety network when the alarm is not cleared, function of connected transmitting to the social safety network as the social safety network code is input, function of messaging a notification to guardian in case of dangerous situation, and function of transmitting situation to the guardian in occurrence of each event such as end of the dangerous situation.

User terminal which is not a smart mobile device may include a control unit controlling each function for the personal protection service; an RF transmit-receive unit and an antenna unit connected to the control unit, modulating and demodulating video data, voice data, packet data, and transmitting and receiving to mobile communication network; a GPS transceiver unit receiving location information of the user terminal; a microphone receiving analogue voice signal; an Analog to Digital converter (ADC) converting the analogue voice signal received from the microphone to digital voice data; an A/V codec compressing/decompressing the video and image; a Digital to Analog converter (DAC) converting the decoded digital voice data to analogue voice signal; a speaker generating sound by amplifying the analogue voice signal provided from the DAC; a memory unit storing driving programs and various data; an input unit receiving key pad input; a display unit outputting data; a USIM chip storing information of universal subscriber identification system of the communication agency and member information; and battery unit driving power with battery equipped.

The user terminal may further include an analogue camera and an ADC, or a compact digital camera.

The dangerous situation information to the personal protection service server may include at least one of the user's voice recorded data, danger message transmitted by input of the user in case of emergency situation, visual image taken by the snap shot in case of emergency situation, or video taken at the site.

In order to achieve another purpose of the present invention, a personal protection service method comprises registering personal information transmitted from an user terminal to a personal protection service server, optionally registering a guardian information who will be contacted in dangerous situation and actual user of the user terminal, and authenticating a user by a nominal owner of the user terminal when the user and the nominal owner are different; setting a social safety network code and a normal unlock code used when an emergency situation transferred from the user terminal to the personal protection service server; and receiving a personal protection service by receiving a GPS location information and time information, a dangerous situation information and the social safety network code from the user terminal and transmit personal protection service server, receive personal protection service, storing the related information of the requested users and events, transferring message to an institute linked to the social safety network, and to a guardian terminal as well when a guardian is registered, transfer the message to the guardian terminal as well, and executing scenario of personal protection by tracking the location of the requested user terminal.

The method may further include registering a guardian whom one wants to reach from the user terminal to the server, storing set of operating condition including a moving path, a number of occurrences of alarm and a time interval, in case of the dangerous situation; and setting and storing function of receiving one's moving path setting and pattern information at equally the same time via a guardian register function which is an additional function, from the user terminal to the personal protection service server; and after the guardian is registered, operation message is transmitted to the guardian terminal whenever the user oneself operates a personal protection service application, and an alarm message is automatically transmitted to the guardian and the social safety network which has personal protection service server set when report is sent to the institute linked to the social safety network.

The method may further include storing, by the personal protection service server, a normal code unlocking the application after recognizing the user, and a social safety network code which automatically linking to the social safety network via the personal protection service server in the dangerous situation, the codes being set from the user terminal, and a plurality of the social safety network codes may be set, and, digits and numbers of the social safety network codes are randomly set.

The user terminal may prevent changing basic information in application set by the user, changes data of the basic information by input the normal code, and the personal protection service server and sends message notifying the dangerous situation to the institute linked to the social safety network wherein when the social safety network code is input from the user terminal in case of the dangerous situation.

The setting, by the user terminal, the social safety network code and the normal unlock code may include storing the received normal unlock code in the personal protection service, or unlocking by receiving a social safety network contact code set by the user to the personal protection service server.

The method may include setting a cycle of one's location tracking in the personal protection service server, by operating the application in the user terminal; when the application is operated, the personal protection service server tracks the location based on the set cycle by a certain duration, and time slot.

The method may further include storing voice in real time by recording the voice in the user terminal in case of the dangerous situation, when the voice recording is set as the additional function, and wherein when the recording function is chosen as the additional function of application of the user terminal, time unit for voice recording and delivery may be set, the personal protection service server transmits the recorded voice to the social safety network as packet data based on the set time interval in case of dangerous situation.

The method may further include storing a picture of the user while a function of the picture transferring is activated, immediately transmitting the picture to personal protection service server and the institute linked to the social safety network when reporting to the social safety network; and storing, by the personal protection service server, by receiving snap shot, mug shot, automatic flash, voice included in video during operating the application after camera function is activated, transmitting the stored to the social safety network. The social safety network may inquire a status message, the picture of the user, the last location, route, input time of the user terminal perceiving the dangerous situation, from the personal protection service server, provide the personal protection service by obtaining the recording information, site picture and voice included in the video, the guardian information in real time when the additional option is chosen, provide analysis and statistics of the application status of use and history of various events under legal circumstances.

The method further include initiating the location tracking of the user terminal in response to input the route of the user terminal, a departing point, destination point, and estimated arrival time is input, each route may be respectively stored in the application of the user terminal, series of designated points and personal route time may be input separately when linked with a map service, and in this case, the same route is stored as an event in the personal protection service server, synchronizing with the setting condition in the user terminals' application, periodically detecting, by the personal protection service server, the location of the user terminal after the user terminal's application is operated, when the personal protection service server is registered operative event of application, the user terminal's location is called upon periodically detecting the danger status, and unlocking the user terminal when there is no response to the call of the user terminal, transmits message notifying the danger to the institute of social safety network danger, and wherein map function is added to the user terminal's application, synchronized with the server, tracking the moving route more precisely, and also the time setting input is possible.

When the timer set by the user terminal is operated, when the personal protection service server is set by the input of time related to the occurrence of the alarm besides the route and route time designated by the user terminal, the personal protection service server operates timer until the respective alarm set, and transmits the alarm to the user terminal following the method input in advance when the normal code is not received from the user after the occurrence of the alarm.

The method may include automatically transmitting alarm from the personal protection service server as social safety network code is input when the first alarm occurs; the first alarm is occurred by the user terminal following the timer set in the personal protection service server. However, when it does not match the conditions of route and time set by the user, or when normal unlock code is not input, it is unlocked as normal code is input in regular circumstances, and in irregular circumstances the danger message is immediately transferred to the social safety network (such as 112, 119) via personal protection service server by inputting the social safety network code. In this case, the message set by the user, guardian information, route information, user's image information, and location information of the user's terminal finally obtained when the alarm occurred is transmitted to the server, and the additional function of automatic recording data, spot video including recorded voice and spot pictures of the dangerous situation is also transmitted to the server, and the social safety network may inquire the CCTV information DB around the spot.

When there is no response to the first alarm, next alarm occurs in the user terminal, and unlock process should be done until the designated time, driving a predetermined timer, by the personal protection service server, by continuously providing alarm in a predetermined time interval until the last alarm; automatically requesting for rescue or help to the social safety network when normal code is not input to the personal protection service server until the occurrence of the last alarm; and steps wherein when there is no response by the personal protection service server until the designated timer (time) after the last alarm, it is immediately linked to the social safety network (such as 112, 119), and in this case, message set by the user, and final information such as user location information, user image information, route information, guardian information, obtained when alarm occurred, and also additional function of automatic record data, video including recorded voice and spot picture is transmitted to the server together is transmitted. After the last alarm signal is received, CCTV intelligence network-linked program is operated which is able to inquire moving route of the user terminal requested in the dangerous situation and CCTV DB nearby the user terminal.

The normal termination in the personal protection service server may be unlocked by inputting the normal unlock code set by the user, and the personal protection service server automatically ends the event, automatically transmits normal-completion information to the guardian set as an additional function, and dangerous situation is finished.

When the application of the personal protection service function in the user terminal checks a capacity of the battery, a capacity of the consumed battery including the options of the user is predicted and secured, the battery is exclusively consumed as top priority excluding other applications and the secured battery capacity is not able to be used in other application, and notify the user when battery is low during the application is operating, it is recommended to optimize the use of application when the remaining capacity of the battery is low on behalf of the option of the application operation.

When report is made by the malfunction of the user terminal, the unlock code for malfunction is input to the personal protection service server, it is unlocked and terminated when the normal unlock code is input, and the user terminal shows as normal unlock while the social safety network process is continuously proceeded when abnormal unlock code is input.

Advantageous Effects

According to the present invention, using application (App) of smart mobile device or a separate portable device, wearable device enables report emergency in cases of dangerous situation occurred moment to moment, or in case of emergency situation by disaster, may input one's route simply, may request personal protection service (Self-safety Guard service) which is able to reach the end point more safely or manage dangerous place or area with various dangerous situations to quickly manage, transmit the personal's location, time, information additionally informed by the personal via smart mobile device or portable device to personal protection service server, thus it is transmitted quickly to rescue team, medial institute, fire station or police station linked to the social safety network which may lead to a quick start of the primary investigation.

When one ran into a criminal, it is almost impossible to directly contacting with one's cell phone of smart mobile in front of the criminal. Therefore, the present invention may enable the system to automatically report to the social safety network.

By providing the users who are without smart mobile device, such as children, women, elderly, disabled or Alzheimer's disease patients, with compact portable device or wearable device with information input in advance by guardian, those users will be able to receive service of social safety network, in case of route-missing or dangerous situation by the same method.

When students who confront sudden school violence ask for help, unable to avoid the perpetrators, they will be able to contact the guardian and police station near by without letting the perpetrators know.

When one asks help to the personal protection service server by using one's terminal, according to the emergency situation, one may receive automatic protection or observation from the institute linked to social safety network.

The personal protection service is notified to the guardians with pregnant woman or the elderly, enables linkage to the emergency medical institute in case pregnant woman shows sign of childbirth, or lessen worries about social activities of elderly who may fall suddenly due to weakness.

The personal protection service may be facilitated usefully in case of missing patients, such as Alzheimer's disease patient, or in case where one is exposed to dangerous environment regardless of one's will.

The personal protection service transmits various situation information collected by the application of the smart mobile device via personal protection service server to the persons in charge who work in the institute linked to the social safety network, therefore social safety officers in the regional medical institute, fire station, police station rescue in cases of dangerous situations such as car accident, fire preventing or disaster situation, prevent various crimes such as violence, robbery, sexual violence, kidnapping and help quickly managing the accident by contributing to the primary investigation.

Provides CCTV network information nearby the site of accident, enhances the efficiency of investigation by linking with the intelligent CCTV network.

A large variety of resources may be obtained and analyzed under legal circumstances, therefore statistics may be compiled and analyzed, and this may lead to acknowledging the weak point of the social security, time, sentiment index of security of citizens and support the arrangement of the preparatory measures.

The use of compact portable device or wearable device may be extended later for use personal receiver of pets and livestock.

The present invention has an effect of preventing various crimes, as it is alerts that the personal protection service exists in our society.

BEST MODE

The preferable examples of the present invention will be described in detail referring to the present invention, with diagram attached.

Figure 1:
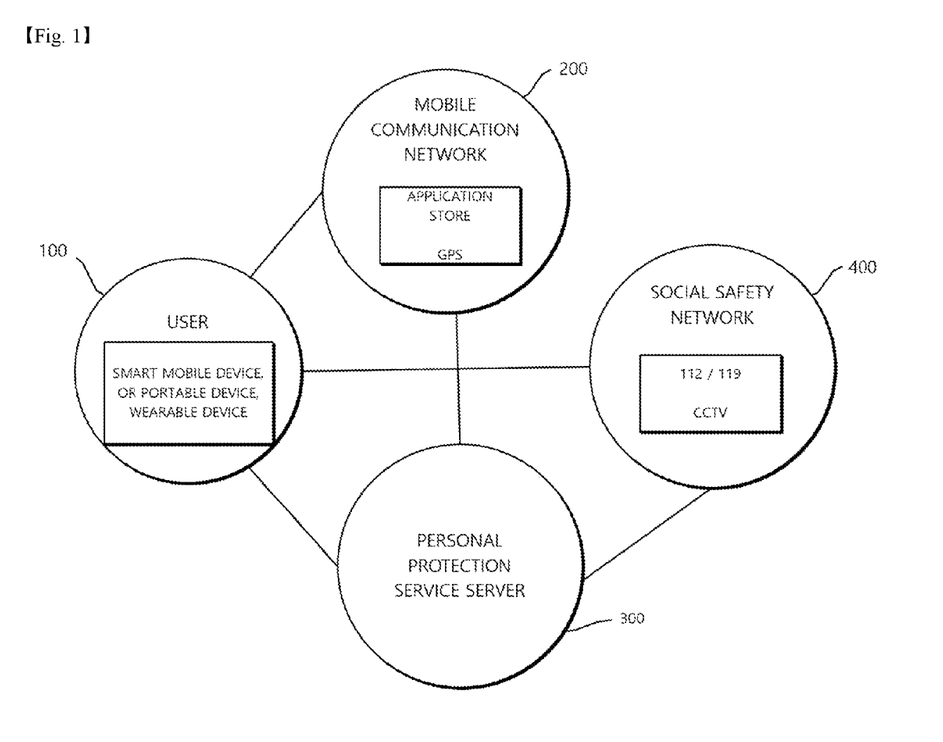
FIG. 1 is a schematic diagram of a personal protection service system using an application of a smart mobile device, and a separate portable device and a wearable device according to an exemplary embodiment of the present invention.

FIG. 1 is a schematic diagram of a personal protection service system using an application of a smart mobile device, and a separate portable device and a wearable device according to an exemplary embodiment of the present invention.

The personal protection service system comprises user terminal 100 requesting personal protection service by transmitting user's basic information, situation setting message, GPS location information and time information of the terminal, dangerous situation information and social safety network code to the server in case of emergency situation; personal protection service server 300 providing personal protection service (Individual Safety Guard service) by connected to the user terminal 100 via mobile communication network 200; and institution terminal (smart phone/mobile communication terminal, computer, CCTV and etc.) connected to the social safety network 400 by connected to the personal protection service server 300.

The user terminal 100 may include one of a smart mobile device (a smart phone, a mobile communication terminal), compact portable device, or wearable device.

In case of emergency situation, user in danger or disaster may push the emergency button of terminal 100 or transmit dangerous situation information to the protection service server 300 and immediately request the following action, transmitting emergency situation to the guardian or the institution terminal connected to the social safety network 400, at the same time location of the rescue-requested user terminal 100 is tracked, so that it is quickly managed in a short time such as 1~2 minutes, safety action is provided as safety personnel immediately mobilized.

The user terminal 100 including a smart mobile device (smart phone), a portable device (mobile communication terminal, or a separated carriable device), and a wearable device is synchronized with the application store of the mobile communication network 200, and may download applications regarding a kind of device from mobile communications company.

In case of emergency situation, the location information and the time information of the user terminal 100 is automatically transmitted to the personal protection service server 300.

The dangerous situation information from user terminal 100 to personal protection service server 300 may include at least one of a voice record data of the user, image of the spot by snap shot or video of the spot.

An intelligent application for user terminal of personal protection service (Individual Safety Guard service) of the present invention has been developed.

The smart mobile device generally refers to smart phone using the LTE modem. A separate portable device used by the user does not have the smart phone may include a mobile communication terminal, a compact portable device or a wearable device including a communicative modem communicating with second, third or fourth generation mobile communication network, and GPS receiving unit.

The user terminal 100 is equipped with the application for personal protection service operated by the server download method. The application function may include joint network registration function, function of designating additional guardian, self-image information, function of transmitting GPS location information and graphic information which is automatically transmitted to the server in case of emergency situation, function of saving number of alarm occurrence and time interval setting, function of frequency setting of user location track, function of recording and transmitting voice recording to the server in case of emergency situation, function of transmitting danger message to the server in case of emergency situation, function of saving and transmitting visual image taken at the site or video in case of emergency situation by snap shot, function of saving and transmitting user's frequently used route information, function of inputting time per user's route, function of social safety network report in case of emergency, function of confirming normal/abnormal code input, social safety network code input and message transmission function, timer function in case of non-response to the alarm occurrence, function of automatic recording in case of alarm, map-linked service function regarding the GPS location of the terminal at the present time, function of designating in case of map-linked by points, function of saving message of occurrence of preceding, function of battery check and exclusive use of capacity of battery, function of checking remaining battery and forcefully closing other operating applications, function of recommending optimization of application use in case of lack of remaining charge of the battery, and function of notifying the power-off due to battery burnt out and other situations.

The personal protection service server 300 comprises function of authentication of a nominal owner when user and nominal owner are different, event occurrence function, event termination function, function of managing the information of actual user, function of saving user route information, time consumed following the route, forms of notification message, function of saving number of alarm occurrence and time interval setting, function of saving user location track cycle setting, function of saving setting and driving time settings set by the user in advance, function of saving and transmitting in case of voice recording, function of receiving user's danger message, function of receiving the terminal's GPS location information and graphic information in case of emergency situation, function of tracking GPS location of the terminal from which the danger message is received, alarm function, function of saving and transmitting danger message/image/video, function of reporting emergency with the user information to the institute linked to social safety network according to the user's situation when the user reports emergency, function of connected transmitting to the institution terminal of the social safety network (e.g., 112, 119, etc.) when the alarm is not cleared, function of connected transmitting to the social safety network as the social safety network code is input, function of messaging a notification to guardian in case of dangerous situation, and function of transmitting situation to the guardian in occurrence of each event such as end of the dangerous situation.

The personal protection service server 300 collects a location information of the user terminal from the user terminal 100, in each alarm occurred when rescue is requested in case of emergency situation and the location of user terminal 100 immediately requested is tracked. The application of the user terminal 100 automatically transmits the location information and the dangerous situation information to the personal protection service server 300 in regard with the emergency situation rescue request, in occurrence of each alarm.

Figure 2:
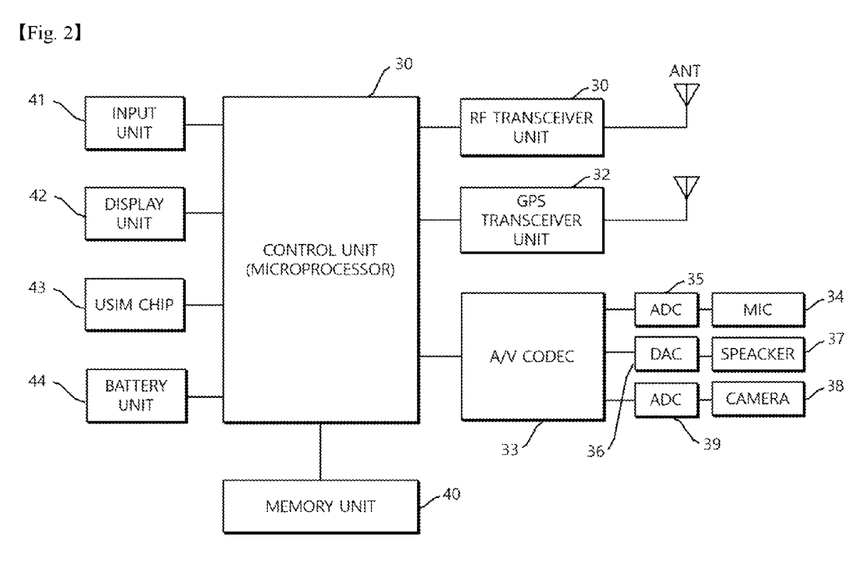
FIG. 2 is a schematic diagram of a smart mobile device, a portable device or a wearable device providing personal protection service (Individual Safety Guard service).

FIG. 2 is a schematic diagram of smart mobile device, portable device or wearable device providing personal protection service (Individual Safety Guard service).

The user terminal may include the smart mobile device, the portable device and the wearable device providing personal protection service. The user terminal includes a control unit controlling each function of video transmission, voice call, text message transmission/reception, packet data transmission/reception for personal protection service; RF transceiver unit 31 connected to the control unit 30, modulating and demodulating video data, voice data and packet data, and transmitting and receiving within the mobile communication network via uplink channel or downlink channel; antenna unit ANT connected to the RF transceiver unit 31; GPS transceiver unit 32 receiving the location information of the user terminal by location using three or four navigation satellite via GPS antenna; microphone 34 receiving voice signal; A/D converter (ADC) 35 converting analogue voice signal received by the microphone 34 to the digital voice; A/V codec 33 compressing/decompressing video and image in cooperating with the control unit 30; D/A converter (DAC) 36 converting the decoded digital voice data to an analogue voice signal; speaker 37 generating sound by amplifying the analogue voice signal provided from the DAC 36; camera 38 including the CMOS Image Sensor and camera circuit and shooting video; ADC 39 converting an analogue video signal taken by the camera 38 to digital video signal; memory unit 40 connected to the control unit 30 and saving driving programs and various data; input unit 41 receiving key pad input or touch input; display unit 42 outputting text, image, graphic, voice and video data; USIM (universal subscriber identity module) chip 43 storing information of universal subscriber identification system of the communication agency and member information is saved; and battery unit 44 driving power with battery equipped.

The portable device and wearable device for users without smart phones, as shown in the FIG. 2, as same as the basic configuration of the smart phone, in regards with the portable wireless transceiver device, compact microprocessor, RF transceiver unit, USIM chip-equipped unit which enables the use of mobile communication, memory unit storing route from PC or external device, GPS receiving unit, speaker or vibration unit of the alarm function, microphone storing voice, and on the exterior, number unit inputting code, enter key, end key and battery unit.

In regards with, the compact portable device and the wearable device may optionally include camera (CMOS Image Sensor and camera circuit), and include analogue camera and ADC or subminiature digital camera.

The portable device or the wearable device may be equipped with identical function to the intelligent application equipped in the application development smart mobile device (smart phone) and simplified functions such as GPS location information, graphic information and function of transmitting danger message.

Figure 3:
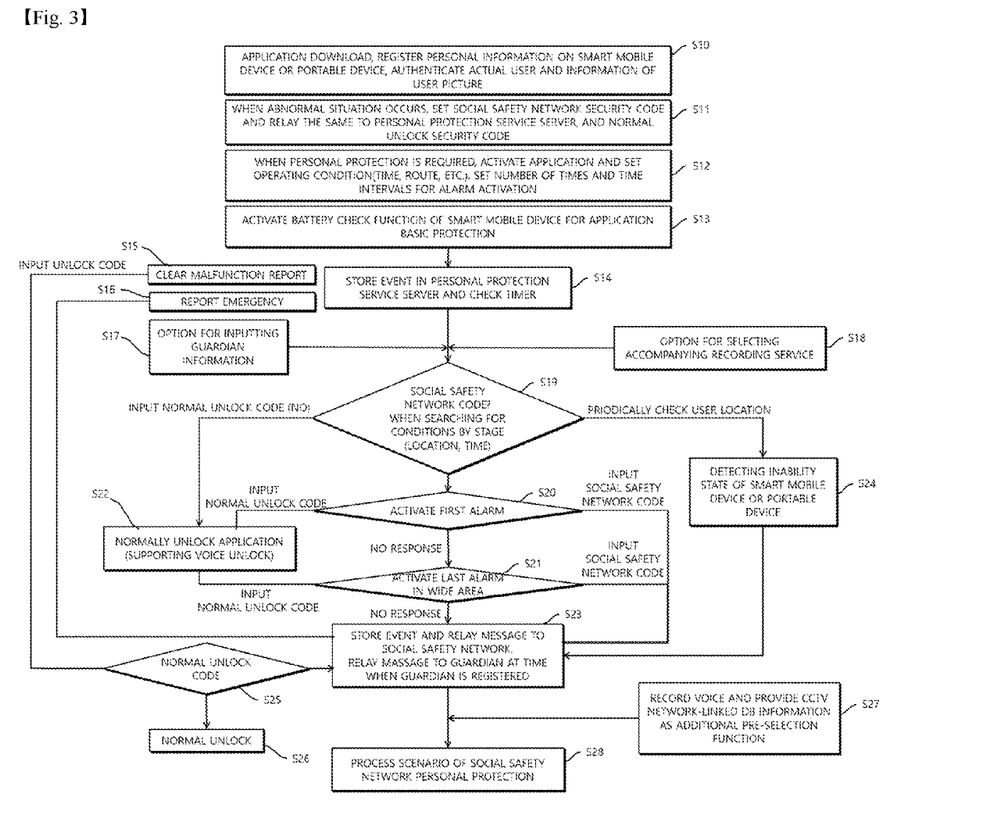
FIG. 3 is a flow chart of personal protection service method using the application of the smart mobile device, and separate portable device and wearable device according to an exemplary embodiment of the present invention.

FIG. 3 is a flow chart of the personal protection service method using the application of the smart mobile device and separate portable device and wearable device according to an exemplary embodiment of the present invention.

The personal protection service reports emergency in case of dangerous situation, or senses dangerous situation of the personal manually or automatically when one strays away from pattern which has been personally set regarding the location change of the personal or various urgent and disastrous situation, dangerous situation and transmits to the institution terminal linked to the social safety network via personal protection service server 300, applying it as a measure to remove the dangerous factors or to quickly manage the dangerous situation, using a separate portable device or wearable device to the user who are able to use the smart mobile device now generalized, and to users who are not able to use those smart mobile device. The personal protection service also makes the social safety network to enable personal relief work and quick management of the situation.

The personal protection service is able to manage actively minute by minute to the emergency situation by oneself, and using the service server at the same time, has a certain function of notifying information and location of the personal to the social safety network, and therefore dramatically improves quickness of the relief activity and management efficiency, pursuits prevention of the social crime social safety network.

A method according to the present invention includes, a step S10 of registering, by a personal protection service server 300, personal information transmitted from the user terminal 100 to personal protection service server 300, the registered optional guardian information who will be contacted in dangerous situation and authenticated actual user, and authenticated the user of a nominal owner of the user terminal when the user and the nominal owner are different, after the application is downloaded and installed from the personal protection service server 300 to user terminal 100; a step S11 of setting, by the personal protection service server, social safety network code and normal unlock code used to transfer from the user terminal to personal protection service server; a step S12 of being set an operating condition including time and moving route, and the number of alarm occurrence and time interval when the user needs protection from the application to the server; a step S13 of receiving function settings including activating battery check function of the user terminal 100 for protecting the function of application, activating camera or video function; a step S14 of checking storage of an event and timer of the personal protection service server; steps of being requested the personal protection service by receiving GPS location information and time information, graphic information, snapshot information, dangerous situation information regarding the user's situation, and social safety network code from the user terminal 100, storing related information and events of requested users, and transferring message to institute linked to social safety network, and when guardian is registered, transferring the message to the guardian terminal as well, tracking the location of requested user terminal and executing the scenario of personal protection in case of emergency situation.

The method further comprises a step of being registered picture information and guardian whom one wants to reach from the user terminal 100 to the personal protection service server 300, storing the operating condition comprising the moving path, number of alarm occurrences and time interval in case of dangerous situation which is received from the user terminal; a step of setting and storing one's moving path setting and pattern information at equally the same time by being transferred that information from the user terminal to the personal protection service via guardian register function which is an additional function; and after guardian registration, whenever user oneself operates the personal protection service application, operation message is transmitted to the guardian terminal, and when reported to the institute linked to the social safety network, alarm message is automatically transmitted to the social safety network and the guardian which has personal protection service server set.

The method further includes a step of storing a normal code upon which the personal protection service server may unlock the application after user recognizes from the user terminal, and a social safety network code upon which the user terminal is automatically linked to the social safety network via personal protection service server in dangerous situation. The normal code and the social safety network code is set from the user terminal. A plurality of social safety network code may be set when needed, and features that the optionally be changeable digits and number.

The user terminal may operate a password function that blocks others' changing the basic information in application set by the user application. When changing the data which stores internal information of the application, normal code should be input to the user terminal. When the social safety network code is input from the user terminal in case of dangerous situation, the message notifying the danger to the social safety network is automatically sent to the institute linked to the social safety network.

A step of setting an application unlock code in the user terminal may include inputting a normal unlock code to the personal protection service server, or unlocking by inputting a social safety network contact code set by the user to the personal protection service server.

The method may include setting one's location track cycle to the personal protection service server, by operating the application in the user terminal operating; when application is operated, the personal protection service server will set one's location track cycle which is set by the user, and will be able to track in terms of a predetermined cycle and a time slot.

The method may further include storing real time recording from the user terminal to personal protection service server in case of dangerous situation, when a recoding function is set as an additional function of the user terminal. Unit of recording time and delivery time may be set when additional function of a recording function is chosen as an application of the user terminal, and the stored recorded content is transmitted to the social safety network as packet data at the user set time interval in case of dangerous situation.

The method further include simultaneously transmitting a picture to the personal protection service server and the institute linked to social safety network when reporting to the institute linked to social safety network, the picture being taken and stored when a transmitting function of the application of user terminal is activated; and after the user activates a camera function, during the application is operating, a snap shot, a mug shot, an automatic flash, a video including voice is transmitted to and stored in the personal protection service server, and transmitting to the social safety network. The social safety network may receive and simultaneously inquire on danger-perceived user terminal's message, last location, route, input time from the service server, provide recording information, video including site picture and voice, guardian information obtained real time when the user chose an additional option, provide history, analysis and statistics of the application status of use and various events under legal circumstances.

The method may include initiating inputting of the user terminal's route location tracking; each route may be stored by using the application of the user terminal when user inputs staring point and end point, series of designated points and personal route time may be input separately when linked with a map service, and in this case, the same route is stored as an event in the personal protection service server, synchronizing with the setting condition in the user terminals' application, periodically detecting, by the personal protection service server, the location of the user terminal after the user terminal's application is operated. When the personal protection service server is registered operative event of application, the user terminal's location is called upon periodically detecting the danger status, and unlocking the user terminal when there is no response to the call of the user terminal, transmits message notifying the danger to the institute of social safety network danger.

When the timer set by the user terminal is operated, when the personal protection service server is set by the input of time related to the occurrence of the alarm besides the route and route time designated by the user terminal, the personal protection service server operates timer until the respective alarm set, and transmits the alarm to the user terminal following the method input in advance when the normal code is not received from the user after the occurrence of the alarm.

The method may include automatically transmitting alarm from the personal protection service server as social safety network code is input when the first alarm occurs; the first alarm is occurred by the user terminal following the timer set in the personal protection service server, when it does not match the conditions of route and time set by the user, or when normal unlock code is not input, it is unlocked as normal code is input in regular circumstances, and in irregular circumstances the danger message is immediately transferred to the social safety network (such as 112, 119) via personal protection service server by inputting the social safety network code, in this case, the message set by the user, guardian information, route information, user's image information, and location information of the user's terminal finally obtained when the alarm occurred is transmitted to the server, and the additional function of automatic recording data, spot video including recorded voice and spot pictures of the dangerous situation is also transmitted to the server, and the social safety network may inquire the CCTV information DB around the spot.

The method may include when there is no response to the first alarm, next alarm is occurred in the user terminal, and unlock process should be done until a predetermined time, and in this case, the personal protection service server periodically transmits the next alarm in the predetermined time interval and continuously operates a predetermined timer until the occurrence of the last alarm in the application; automatically requesting for rescue or help to the social safety network when normal code is not input to the personal protection service server until the occurrence of the last alarm; and steps wherein when there is no response by the personal protection service server until the designated timer (time) after the last alarm, it is immediately linked to the social safety network (such as 112, 119), and in this case, message set by the user, and final information obtained as alarm occurred, such as user location information, user image information, route information, guardian information, is transmitted, and also additional function of automatic record data, video including recorded voice and spot picture is transmitted to the server together; after the last alarm signal is received, CCTV intelligence network-linked program is operated which is able to inquire moving route of the user terminal requested in dangerous situation and CCTV DB nearby the user terminal.

The normal termination in the personal protection service server may be unlocked by inputting the normal unlock code set by the user, the personal protection service server automatically ends the event, automatically transmits normal-completion information to the guardian set as an additional function, and dangerous situation is finished.

The method features that when the personal protection service function is operated as a battery is checked as a function of the personal protection service application of the user terminal, personal protection service function, a capacity of the consumed battery including the options of the user is predicted and secured, the battery is exclusively consumed as top priority excluding other applications and the secured battery capacity is not able to be used in other application, and notify the user when battery is low during the application is operating, it is recommended to optimize the use of application when the remaining capacity of the battery is low on behalf of the option of the application operation.

The unlock code for the malfunction is input to the personal protection service server when report is made by the malfunction of the user terminal 100. It is normally unlocked and terminated when normal unlock code is input, and the user terminal shows as normal unlock while the social safety network process is continuously proceeded when abnormal unlock code is input.

As technology of preventing false report when easily linked to the social safety network and mistaken report although it does not comprise risk factor is equipped to the application and device, leakage of operation of the public institute by wrong report is decreased, and the service secures safety by automatic linkage to the social safety network when on acknowledges dangerous situation (sexual crime, kidnapping, car accident, strayed due to tripping while mountain climbing, unintentionally running into a mob of criminals and etc.).

Moreover, when the criminal realizes the relevant system and tries to unlock by snatching the unlock code forcefully by the user, the user will operate the social safety network code (code set by the user) instead of normal unlock code (code which ends the operation of application right away) in case of emergency situation, reporting at the social safety network. When the social safety network code is input to the user terminal, it will seem to operate as normal completion state, but danger message will be reported to the institute linked to the social safety network via personal protection service server 300.

The personal protection service server 300 records user, user's picture, guardian (if there is one), route, location, time, moving route time, and etc. stored in the database when the personal protection service application is operated (when event occurs), and will transmit the dangerous situation information to the institute (rescue team, medical institute, police station) linked to the social safety network after the last alarm.

The user may register the route in the user application from terminal 100, set the starting point, the end point, and input designated time consumption, the personal protection service application will be immediately operated, a cycle of the location tracking may be set in advance.

At both time of dangerous situation occurs and dangerous situation is ended, the user terminal 100 transmits the dangerous situation to the guardian terminal (mobile communication terminal) set in advance via the personal protection service server 300.

The user terminal 100 may exclusively occupy and use battery capacity consumed when personal protection service application is operated, and when determining battery of the smart mobile device is not sufficient, comprises function of stopping other application the user using and recommending optimization of operating application, with remaining battery capacity, and comprises function of sending the message to the guardian terminal in case of termination of the application with alarm and termination of user terminal due to insufficient battery.

A separate portable device and wearable devices operates the same function with the smart mobile device.

The user route is generally set at the point where transportation is no longer available, destination point, or area or location by time to time in real time where one might feel dangerous, and route and time of arrival may be given by each point via detailed map information as an additional function. In this case, detailed location of the terminal which requested for dangerous situation is automatically tracked in a cycle, and route to the destination is automatically analyzed.

When the user feels danger and decides that the additional function is required, the user may take a picture of the site and save it, using it when reporting to the social safety network, and more specific information may be sent to the institute of social safety network as activating the recording function and the video function at the same time.

When the personal protection service application is operated, the personal protection service server 300 simultaneously transmits operation information of the application to the guardian terminal which is set as an additional function.

When the user reaches the endpoint in time set by a certain route, may stop the operation of the personal protection service application by inputting the normal unlock code. When the location of the endpoint is not easily detected, one may input normal code to unlock. In this case, the information registered in the personal protection service server 300 in forms of an event normally ends, automatically.

When user encounters an unintentional situation, the user may notify the dangerous situation to the institute linked to guardian and social safety network by emergency report via personal protection service server 300 at the same time by inputting code, exceeding time consumption, by no response in other words.

In order to prevent reckless transmission of danger message to the social safety network, when a certain terminal breaks a primary alarm in the above situation, the message is not instantly sent to the institute of social safety network, and an extra time may be input until next alarm occurs. However, in situations it is not possible, by inputting code to the social safety network, the message is delivered automatically to the institute linked to social safety network via personal protection service server 300.

After the last alarm set in advance, if the user is in danger that one may not be able to use the user terminal such as smart mobile device, etc., or if the user terminal is broken by the criminal at site, the personal protection service server 300 operates the timer of application together, and recognizes that the normal unlock code was not received, therefore sends danger message, user location input in advance, user picture information, route, estimated arrival time, and guardian information, and additional service setting information such as voice recording, image, video information are sent at the same time.

From the starting alarm to last alarm, the application of the user terminal transmits the user location GPS information and graphic information of the user terminal to the personal protection service server 300.

The danger notification information is stored in the database of the personal protection service server, transmitted to the terminal linked to the social safety network, regarding the content transmitted, each police station and fire station will start its process such as primary investigation.

Wireless transmitter of the separate portable device or wearable device for users without the smart mobile device may input pre-input route which the user usually uses by PC or by smart terminal to the personal protection service server 300, and in case of dangerous situation, may operate with an execution key of the user terminal.

Moreover, the personal protection service server may be operated in the institute of the social safety network.

Function of registering information of the person who needs protection to the personal protection service server via mobile application, function of confirming the actual user and function of nominal owner registering the actual user when the actual user and nominal owner of the smart mobile device/portable device/wearable device is different, function of setting normal unlock code in case of alarm, function of setting secret code for reporting to the social safety network in case of situation needing report, function of selecting personal situation of the user when the personal protection service application is operated, function of setting a plurality of guardians who will be contacted with the institute linked to the social safety network in case of situation needing report, user's picture information, function of reporting emergency in case of situation needing emergency report, function of setting ordinary moving path and time by real time and registration in advance, function of setting user location track cycle, function of setting one's moving pattern by inputting the location change and time, function of synchronizing one's moving path and pattern with the guardian, function of transmitting the situation to the guardian terminal in case of each event, such as occurrence of the dangerous situation and termination of the dangerous situation, function of automatically transmitting to the institute linked to social safety network via personal protection service server 300 when problems occur regarding the moving pattern, time or stray of the set route, function of transmitting the user location information in case of alarm occurrence, function of providing nearby CCTV information nearby linked to social safety network and function of connecting of intelligent CCTV and automatically search public intelligent network, function of voice recording and delivering when danger is detected, and by the battery check and exclusive usage function of the mobile device enables securing operation for a certain amount of time, function of recommending optimized usage in case of insufficient battery capacity, function of registering and delivering voice recording, image, video taken, function of inputting and distinguishing normal unlock code in case that the user terminal reports by malfunction, providing the separate portable device or the wearable device with function of the same purpose to users without the smart mobile device, and developing device which is easily accessible to the institute linked to the social safety network, and therefore confirmation of location in case of person in danger and case transfer to the institute linked to the social safety network is available, responding quickly, dramatically improves one's wellness and society's safety, and prevents crimes as the personal protection service of the present invention exists in society.

The user carries the smart mobile device, the portable device or the wearable device, accesses to the relevant mobile communication network 200 and downloads the personal protection service application (tentatively named Individual Safety Guard). As an additional function, more than one guardian may be chosen and input.

The personal protection service server 300 registers the actual user of the user terminal 100, and when the user and nominal owner are different, the nominal owner may certify the actual user and register.

The user terminal 100 inputs the setting of normal unlock code and the social safety network code in occurrence of alarm in advance, and the normal unlock code and the social safety network code is registered in the personal protection service server 200.

The normal unlock code is input when the situation is terminated, when alarm occurs due to route-stray and designated time consumption, and when input in case of unlocking the malfunction due to negligence of the user terminal 100 and decision that personal protection service application is not functioning regularly, the operation of personal protection service application is automatically terminated when the normal unlock code is input.

The social safety network code may be used when there is no response after the occurrence of the last alarm, when the user is in need of urgent contact, when the smart mobile device or the portable device/wearable device is shown as in undetectable state while the location tracking is activated. Normal unlock state is shown when the social safety network code is input in the smart mobile device, the danger message of the user terminal 100 immediately input may be transmitted to the social safety network 400 via personal protection service server 300 in case of emergency situation.

The form of the alarm may be bell, or message directing the input of the unlock code, vibration, or in forms of sound or music saved in advance. Moreover, user terminal 100 may directly set the alarm interval and number of times between the first alarm and the last alarm.

In the guardian register function, emergency contact information of friends and parents besides the social safety network may be chosen and input in the personal protection service application of the user terminal in advance, and by guardian terminal, message is transmitted to the guardian terminal when the application is started and terminated, when the user terminal inputs the social safety network code, or when one's location tracking function does operate due to loss of the phone or by problem of the base station.

The dangerous situation may be acknowledged by the personal protection service application when one wants to transmit one's dangerous situation to the institute linked to social safety network by inputting the message one registered in advance via personal protection service 300. In other words, general situation message comprising way back home, and in cases such as short distance trip mountain climbing and tracking, accompaniment with a stranger in unintentional circumstances acknowledging danger, or walk to an unfamiliar place is set in the application, which enables rather more detailed specification of the user's danger as it is selected to input and is transmitted to the social safety network.

When the personal protection service application is operated, the battery check function is automatically performed. When the remaining capacity of battery of the user terminal is not able to operate for the designated length of time, function of notifying to the user terminal 100 in advance is comprised, and operation of other application by be limited in order to exclusively operate the application. Moreover, when remaining capacity of battery is less compared to that of option used by application chosen by the user, it is recommended that usage of the application is optimized. Furthermore, when the application is not able to operate due to general consumption of the battery, message is transmitted to the registered guardian terminal (for example, mobile communication terminal), and danger message is not transmitted to the institute linked to the social safety network. However, when one's location tracking function is also activated with sufficient capacity of the battery when battery is checked, it is decided that battery was randomly snatched, and the danger message is transmitted to the social safety network.

The location tracking function is a function to record one's location information received from the user terminal 100 in the protection service server 300 via mobile communication network 200. The cycle and timer of the location information may be set, and when battery is separated randomly, exposed to danger or if the criminal breaks the user terminal intentionally or puts it in liquid such as water making smart mobile device, portable device or wearable device in an undetectable state, the personal protection service server 300 may periodically detect it, and when there is no response, decides that the user is in a dangerous state so the danger message is sent to the institute linked to social safety network.

There is a function to unlock malfunction of the smart mobile or other portable device. After initiating the application, when the user terminal 100 may recklessly and repeatedly input the wrong code or directly input social safety network code, the personal protection service server 300 which received these code needs to receive the normal code from the user in time estimated by the timer, otherwise action of linking to the terminal of institute of social safety network will be proceeded.

After initiating the application, when the user detects unusual or dangerous situation, one immediately inputs the social safety network code or pushes predetermined emergency button to link the social safety network automatically transmitted to terminal of institute linked to social safety network via personal protection service server 300.

Figure 4:
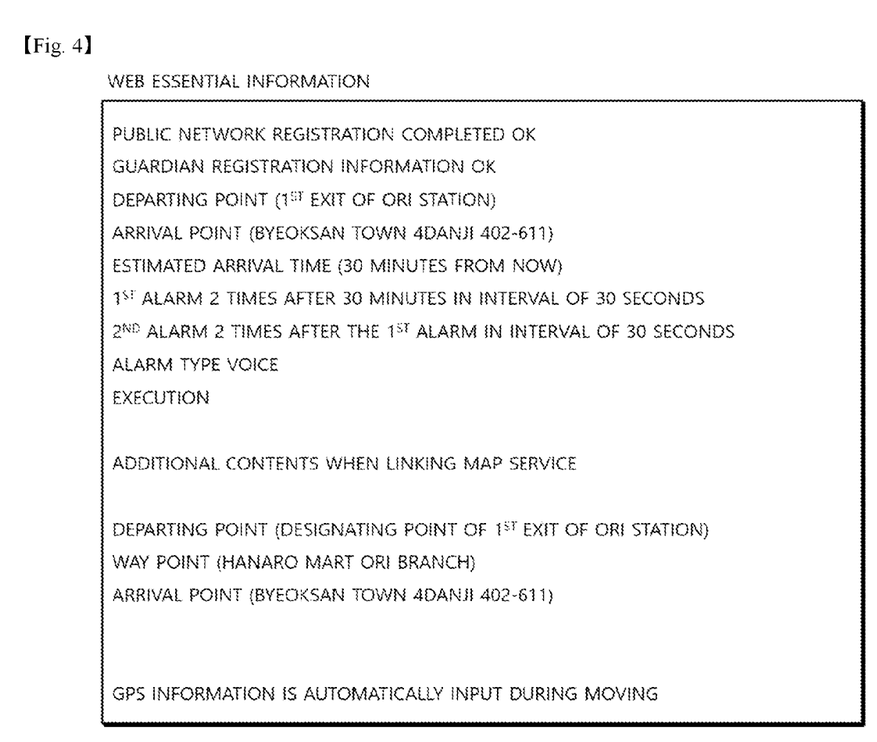
FIG. 4 is an exemplary screen display of essential web information.

When inputting route setting, expected route through the departing point to the destination point may be input. When the destination point is of long distance, a plurality of stops may be set. When inputting the route, expected time consumption will be shown automatically by calculation regarding the general walking distance, and one may also input time individually according to one's specific walking condition. For example, after setting the route from the departing point, Ori station, to destination point, Jukjeon Byeoksan 2 Danji, one may change 15 minutes which is general walking time automatically show to 20 minutes, and personal protection service application may start operating right away.

On pushing the service execution button after the application setting is done, the application automatically activates track function of one's location, and the content input in the application is automatically transmitted to the personal protection service server 300. Moreover, the user terminal 100 by transmit notification regarding one's setting, to guardians such as parents and friends.

The personal protection service server 300 receives contents input transmitted by the user terminal 100 and it is registered in in forms of event, and route time, first activation of alarm timer, last activation of alarm timer set by the personal protection service application is performed sequentially. When the location tracking is activated, location tracking message set in advance will be transmitted to the user terminal, and with response to it, sequentially records the event and dangerous situation information.

When personal protection service application is operated, the user terminal 100 may function of recording voice and delivering it to the server 300. When the user records the state of real time, the personal protection service server 300 operates the recording function by receiving the recording data of the user is from the user terminal 100. Moreover, the application of the user terminal 100 itself may perform recording function, so starting point of recording activation, recording interval and recording transmitting method may be set.

When the personal protection service application is operated, image may be registered and delivered to the personal protection service server 300. The user terminal 100 may register one's location or face in advance, and also has function of capturing the criminal or site of crime and registering to the personal protection service server 300. The personal protection service server 300 collects and delivers to the terminal linked to the social safety network.

When application is operated, the user terminal sequentially takes video of the spot of dangerous situation, and registers and transmits the taken video to the personal protection service server 300 dangerous situation. The personal protection service server 300 collects data and delivers to the social safety network and terminal of the linked institute.

When the user terminal 100 is suddenly exposed to the dangerous situation, the user terminal 100 may immediately input the social safety network code. If there is no spare time to input the code, by the timer set in advance, the first alarm function is operated in the smart mobile device. If the normal code is not input between the first alarm and the time set before the last alarm, the last alarm occurs. If the normal code is not input even after the last alarm, the personal protection service server 300 immediately transmits situation message and user picture information, regular route information, route-time information including stop-by already registered, recorded voice, image, video, guardian, location tracking information is immediately transmitted to the social safety network 400 and terminal of the linked institute.

When the criminal is to input the unlock code in order to unlock the first or last alarm of the application user terminal 100, in case of three or more times of wrong code or social safety network code, the smart mobile device will show normal unlock form and unlock the alarm, and personal protection service server 300 will immediately transmit situation message and user picture information, route information, route-time information comprising one's stops, voice recording, video, guardian information, location track information which is already registered in the application to the social safety network 400 and the terminal linked to the institute.

When the criminal intentionally incapacitate or damage the smart mobile device or portable device or wearable device of the user terminal 100, when there is no response until the last alarm or precedent alarm such as location track timer is acknowledged, the personal protection service server 300 immediately transmits pre-registered situation message in the personal protection service application of the user terminal 100, user picture information, route information, route-time information including stop-by, voice recording, image taken at the spot, video, guardian information, location track information to the social safety network 400.

An appropriate action is done among the areal medical institute, fire station and police station in response to the danger notification signal reported to the institute linked to the in social safety network 400 regarding the situation.

In case of normal completion, when the user terminal 100 reaches the end point in the operating personal protection service application, the normal unlock code may be input to finish the completion of reaching the end point, the personal protection service server 300 confirms the normal completion of the application and the event is completed.

In case of leisure activity such as mountain climbing or tracking, the user terminal 100 inputs the starting point and the end point, and time also, when the user is lost or strays off the mobile communication network, the personal protection service server 300 transmits message to the guardian terminal, the personal protection service server 300 will immediately transmit the situation message and user picture information, route information, route-time information comprising one's stops, voice recording, video, guardian information, location track information which is previously registered in the application to the social safety network 400 and the terminal linked to the institute.

By providing the users who are without smart mobile device, such as children, women, elderly, disabled or Alzheimer's disease patients, with compact portable device or wearable device with information input in advance by guardian, those users will be able to receive service of social safety network, in case of route-missing or dangerous situation by the same method.

As described before, the method of the present invention may be materialized as a program, and saved in forms of recording media (such as CD-ROM, RAM, ROM, memory card, hard disk, magneto-optical disk, storage device, and etc.) readable by computer software.

As described above, the preferable examples of the present invention were referred to for the description, one with general knowledge of this field of present invention may implement the present invention with various modification and transformation as long as it is within the technical idea and area of the present invention.

DESCRIPTION OF THE SIGNS

100: Smart mobile device or portable device or wearable device
200: Mobile communication network
300: Personal protection service server
400: Social safety network

INDUSTRIAL APPLICABILITY

According to the present invention, using application of smart mobile device or a separate portable device, wearable device enables report emergency in real time, moment to moment, in case of emergency situation by danger or disaster, may input one's route simply, and reach the end point more safely, may request personal protection service (Individual Safety Guard service) which is able to manage dangerous place or area with various dangerous situations to quickly manage, by transmitting the personal's location, time, information additionally informed by the personal via smart mobile device or portable device to personal protection service server, thus it is transmitted quickly to rescue team, medial institute, fire station or police station linked to the social safety network which may lead to a quick start of the primary investigation.

When one ran into a criminal, it is almost impossible to directly contacting with one's cell phone of smart mobile in front of the criminal. Therefore, the present invention may implement the system to automatically report to the social safety network.

By providing the users who are without smart mobile device, such as children, women, elderly, disabled or Alzheimer's disease patients, with compact portable device or wearable device with information input in advance by guardian, those users will be able to receive service of social safety network, in case of route-missing or dangerous situation by the same method.

When students who confront sudden school violence ask for help, unable to avoid the perpetrators, they will be able to contact the guardian and police station near by without letting the perpetrators know.

When one requests to the personal protection service server by using one's terminal, according to the emergency situation, one may receive automatic protection or observation from the institute linked to social safety network.

The personal protection service is notified to the guardians with pregnant woman or the elderly, enables linkage to the emergency medical institute in case pregnant woman shows sign of childbirth, or lessen worries about the elderly's social activity wherein the elderly may fall suddenly due to weakness.

The personal protection service may be facilitated usefully in case of missing patients, such as Alzheimer's disease patient, or in case where one is exposed to dangerous environment regardless of one's will.

The personal protection service transmits various situation information collected by the application of the smart mobile device via personal protection service server to the persons in charge who work in the institute linked to the social safety network, therefore social safety officers in the regional medical institute, fire station, police station rescue in cases of dangerous situations such as car accident, fire preventing or disaster situation, prevent various crimes such as violence, robbery, sexual violence, kidnapping and help quickly managing the accident by contributing to the primary investigation.

Provided the CCTV network information near the accident spot, and enhance the effectivity of the investigation by linking with the intelligent CCTV network.

A large variety of resources may be obtained and analyzed under legal circumstances, therefore statistics may be compiled and diagnosed, and this may lead to acknowledging the weak point of the social security, time, sentiment index of security of citizens and support the arrangement of the preparatory measures.

Compact portable device or wearable device may be extended later to pets and livestock for use personal receiver.

The present invention has an effect of preventing various crimes, as it is alerted that the personal protection service exists in our society.

The invention claimed is:

1. A personal protection service system, comprising:
a user terminal configured to request a personal protection service in case of an emergency situation by transmitting a user's basic information, a situation setting message, a GPS location information of the user terminal, a time information, a dangerous situation information, and social safety network code;
a personal protection service server configured to provide the personal protection service accessed by the user terminal via a mobile communication network; and
an institution terminal linked to a social safety network by being linked to the personal protection service server,
wherein the user terminal comprises at least one of a smart mobile device, a compact portable device, or a wearable device, and is operated with an application for the personal protection service,
wherein the application is configured to operate with user's picture registration function, additional guardian setting function, function of transmitting GPS location information and time information to the server in case of the emergency situation, function of recording voice and transmitting the recorded voice to the server in case of the emergency situation, function of transmitting the danger message to the server in case of the emergency situation, function of storing and transmitting video of the site or visual image of the site taken by snap shot to the server in case of the emergency situation, function of storing and transmitting user's frequently-use route information, function of time input by route of the user, function of setting alarm for numbers of occurrence and time interval, function of setting a cycle of user location tracking, function of emergency report to the social safety network, function of confirming normal/abnormal code input, functions of social safety network code input and message transmission, timer function in case of non-response to the alarm occurrence, function of automatic recording in case of the alarm, map-linked service function regarding a GPS location information of the present terminal, function of designating by points during the map-linked service, function of storing message of occurrence of preceding, function of battery check and exclusive use of capacity of battery, function of checking remaining battery and forcefully closing other operating application, function of recommending optimization of application use in case of lack of remaining battery, and function of notifying the power-off due to battery burnt out and other situations, wherein when an emergency button is pushed in case of an emergency situation while the application of the user terminal operates, the user terminal provides a function of immediately reporting stored application information of the user, location, time information, and dangerous situation information to the social safety network, and a function of reporting to the guardian terminal when a guardian option is chosen.

2. The personal protection service system according to claim 1, comprising:
the personal protection service server configured to operate with function of management of actual user information, function occurring event, function of terminating the event, function of receiving the user information, guardian information, and danger message, function of storing user route information, time consumed following the route, forms of notification message, number of alarm occurrence, and time interval setting, function of storing cycle of user location track, function of setting and driving timer set by the user in advance, function of storing and transmitting of the recorded voice, function of receiving user's danger message, function of receiving terminal's GPS location information and time information in case of the emergency situation, function of tracking terminal's GPS location which received the danger message, alarm function, function of storing and transmitting danger message/image/video, function of reporting emergency with the user information to the institute linked to the social safety network regarding the user's situation when the user reports emergency, function of connected transmitting to the institution terminal of the social safety network when the alarm is not cleared, function of connected transmitting to the social safety network as the social safety network code is input, function of messaging a notification to guardian in case of dangerous situation, and function of transmitting situation to the guardian in occurrence of each event including an end of the dangerous situation.

3. The personal protection service system according to claim 1, comprising:
the user terminal configured to comprise
a control unit configured to control each function for the personal protection service;
an RF transceiver unit and an antenna unit connected to the control unit, the RF transceiver unit and the antenna unit being configure to modulate and demodulate video data, voice data, packet data, and transmit and receive the modulated or demodulated data through the mobile communication network;
a GPS transceiver unit configured to receive location information of the user terminal;
a microphone configured to receive analogue voice signal;
an Analog to Digital converter (ADC) configured to convert the analogue voice signal received from the microphone to digital voice data;
an A/V codec configured to compress/decompress the video and image;
a Digital to Analog converter (DAC) configure to convert the decoded digital voice data to analogue voice signal;
a speaker configured to generate sound by amplifying the analogue voice signal provided from the DAC;
a memory unit configured to store driving programs and various data;
an input unit configured to receive key pad input;
a display unit configured to output data;
a USIM chip configured to store information of universal subscriber identification system of the communication agency and member information; and
a battery unit configured to drive power with battery equipped.

4. The personal protection service system according to claim 3, wherein the user terminal further includes an analogue camera and an ADC, or a compact digital camera.

5. The personal protection service system according to claim 1, wherein the
the dangerous situation information to the personal protection service server includes at least one of the user's voice recorded data, danger message transmitted by input of the user in case of emergency situation, visual image taken by the snap shot in case of emergency situation, or video taken at the site.

6. A personal protection service method, comprising:
registering personal information transmitted from a user terminal to a personal protection service server, optionally registering a guardian information who will be contacted in dangerous situation and actual user of the user terminal, and authenticating a user by a nominal owner of the user terminal when the user and the nominal owner are different;
setting a social safety network code and a normal unlock code used when an emergency situation transferred from the user terminal to the personal protection service server;
requesting, when the emergency situation occurs, a personal protection service by receiving a GPS location information and time information, a dangerous situation information and the social safety network code from the user terminal, storing the related information of the requested users and events, transferring message to an institute linked to the social safety network, and to a guardian terminal as well when a guardian is registered, and executing scenario of personal protection by tracking the location of the requested user terminal;
registering the guardian whom one wants to reach from the user terminal to the server, storing set operating condition including a moving path, a number of occurrences of alarm and a time interval, in case of the dangerous situation; and
setting and storing a function of receiving one's moving path setting and pattern information at equally the same time via a guardian register function which is an additional function, from the user terminal to the personal protection service server;
and wherein after the guardian is registered, operation message is transmitted to the guardian terminal whenever the user oneself operates a personal protection service application, and an alarm message is automatically transmitted to the guardian and the social safety network which has personal protection service server set when report is sent to the institute linked to the social safety network.

7. The personal protection service method according to claim 6, further comprising:
storing, by the personal protection service server, a normal code which unlock the application after recognizing the user, and a social safety network code which automatically linking to the social safety network via the personal protection service server in the dangerous situation, the codes being set from the user terminal, and wherein a plurality of the social safety network codes is set, and digits and numbers of the social safety network codes are randomly set.

8. The personal protection service method according to claim 6, wherein the user terminal prevents changing basic information in application set by the user, changes data of the basic information by input the normal code, and the personal protection service server sends message notifying the dangerous situation to the institute linked to the social safety network when the social safety network code is input from the user terminal in case of the dangerous situation.

9. The personal protection service method according to claim 6, wherein the setting the social safety network code and the normal unlock code comprises storing the received normal unlock code in the personal protection service, or unlocking by receiving a social safety network code set by the user to the personal protection service server.

10. The personal protection service method according to claim 6, further comprising:

storing voice in real time by recording the voice in the user terminal in case of the dangerous situation, when the voice recording is set as an additional function, and wherein when the voice recording is chosen as the additional function of application of the user terminal, time unit for the voice recording and delivery are set, the personal protection service server transmits the recorded voice to the social safety network as packet data based on the set time interval in case of the dangerous situation.

11. The personal protection service method according to claim 6, further comprising:

storing a picture of the user while a function of the picture transferring is activated, immediately transmitting the picture to the personal protection service server and the institute linked to the social safety network when reporting to the social safety network; and storing and transmitting, by the personal protection service server, by receiving snap shot, mug shot, automatic flash, voice included in video during operating the application after camera function is activated, to the social safety network;

and wherein the social safety network is configured to inquired a status message, the picture of the user, the last location, route, input time of the user terminal perceiving the dangerous situation, from the personal protection service server, provide the personal protection service by obtaining the recording information, site picture and voice included in the video, the guardian information in real time when the additional option is chosen, provide analysis and statistics of the application status of use and history of various events under legal circumstances.

12. The personal protection service method according to claim 6, comprising:

initiating the location tracking of the user terminal in response to input the route of the user terminal; wherein a departing point, destination point, and estimated arrival time is input, each route is respectively stored in the application of the user terminal, series of designated points and personal route time are input separately when linked with a map service, and in this case, the same route is stored as an event in the personal protection service server, synchronizing with the setting condition in the user terminals' application, periodically detecting, by the personal protection service server, the location of the user terminal after the user terminal's application is operated, when the personal protection service server is registered operative event of application, the user terminal's location is called upon periodically detecting the danger status, and unlocking the user terminal when there is no response to the call of the user terminal, transmits message notifying the danger to the institute of social safety network danger and wherein map function is added to the user terminal's application, synchronized with the server, tracking the moving route more precisely, and also the time setting input is enabled.

13. The personal protection service method according to claim 6, wherein when a timer set by the user terminal is operated, when the personal protection service server is set by the input of time related to the occurrence of the alarm besides the route and route time designated by the user terminal, the personal protection service server operates timer until the respective alarm set, and transmits the alarm to the user terminal following the method input in advance when the normal code is not received from the user after the occurrence of the alarm.

14. The personal protection service method according to claim 6, comprising:

automatically transmitting alarm from the personal protection service server as social safety network code is input when the first alarm occurs;

first alarm is occurred by the user terminal following a timer set in the personal protection service server, and when it does not match the conditions of route and time set by the user, or when normal unlock code is not input, it is unlocked as normal code is input in regular circumstances, and in irregular circumstances the danger message is immediately transferred to the social safety network via personal protection service server by inputting the social safety network code; the message set by the user, guardian information, route information, user's image information, and location information of the user's terminal finally obtained when the alarm occurred is transmitted to the server, and the additional function of automatic recording data, spot video including recorded voice and spot pictures of the dangerous situation is also transmitted to the server, and the social safety network inquires the CCTV information DB around the spot.

15. The personal protection service method according to claim 14, comprising:

driving a predetermined timer, by the personal protection service server, by continuously providing alarm in a predetermined time interval until the last alarm, —when there is no response to the first alarm, next alarm occurs in the user terminal, and unlock process should be done until the designated time—;

automatically requesting for rescue or help to the social safety network when normal code is not input to the personal protection service server until the occurrence of the last alarm;

linking to the social safety network when there is no response by the personal protection service server until the designated timer(time) after the last alarm; and transmitting a message set by the user, final information obtained when an alarm occurs including user location information, user image information, route information, guardian information, and information obtained operating an additional function including automatic record data, video including recorded voice and spot picture, to the server;
wherein after the last alarm signal is received, CCTV intelligence network-linked program is operated which is able to inquire moving route of the user terminal requested in the dangerous situation and CCTV DB nearby the user terminal.

16. The personal protection service method according to claim 14, wherein the normal termination in the personal protection service server is unlocked by inputting the normal unlock code set by the user, and the personal protection service server automatically ends the event, automatically transmits normal-completion information to the guardian set as an additional function, and dangerous situation is finished.

17. The personal protection service method according to claim 6, wherein when the application of the personal protection service in the user terminal checks a capacity of the battery, a capacity of the consumed battery including the options of the user is predicted and secured, the battery is exclusively consumed as top priority excluding other applications and the secured battery capacity is not able to be used in other application, and notify the user when battery is low during the application is operating, it is recommended to optimize the use of application when the remaining capacity of the battery is low on behalf of the option of the application operation.

18. The personal protection service method according to claim 6, wherein the unlock code for malfunction is input to the personal protection service server when report is made by the malfunction of the user terminal, it is unlocked and terminated when the normal unlock code is input, and the user terminal shows as normal unlock while the social safety network process is continuously proceeded when abnormal unlock code is input.

* * * * *